United States Patent

Rubin

[15] 3,635,669

[45] Jan. 18, 1972

[54] METHOD OF PRODUCING CONCENTRATED PHOSPHORIC ACID COMPOUNDS FROM PHOSPHATE ROCK

[72] Inventor: Allen G. Rubin, Walnut Creek, Calif.

[73] Assignee: B. D. Bohna & Company, Inc., San Francisco, Calif.

[22] Filed: Dec. 26, 1968

[21] Appl. No.: 786,877

[52] U.S. Cl. ................................ 23/165, 23/107, 23/109
[51] Int. Cl. ............... C01b 25/18, C01b 25/28, C01b 25/30, C01b 25/32
[58] Field of Search ................ 23/165, 165 C, 107, 109; 71/34, 43

[56] References Cited

UNITED STATES PATENTS

| | | | |
|---|---|---|---|
| 1,838,431 | 12/1931 | Milligan | 23/165 |
| 2,716,591 | 8/1955 | Thomsen | 23/165 |
| 2,880,063 | 3/1959 | Baniel et al. | 23/165 |
| 3,245,777 | 4/1966 | Chang | 71/39 |

FOREIGN PATENTS OR APPLICATIONS 1,480,633  4/1967  France.....................................23/165

Primary Examiner—Oscar R. Vertiz
Assistant Examiner—Gregory A. Heller
Attorney—Fryer, Tjensvold, Feix, Phillips & Lempio

[57] ABSTRACT

Phosphate rock is digested with molten ammonium bisulfate and between 5 and 16 percent by weight of water to form a solid reaction product. The water is added to the mixture of phosphate rock and ammonium bisulfate either before, during or after the digestion reaction between the phosphate rock and molten ammonium bisulfate. Concentrated phosphoric acid is extracted from the ground, solid reaction product with a nonaqueous, polar, oxygen-containing organic solvent having between one and ten carbon atoms. A phosphoric acid compound or in other words a phosphate is then separated from the solvent either in the form of concentrated phosphoric acid by evaporating the solvent, or in the form of a phosphate salt by adding a base to the extract and precipitating the phosphate salt.

7 Claims, 2 Drawing Figures

INVENTOR
ALLEN G. RUBIN

ATTORNEYS 3,635,669

METHOD OF PRODUCING CONCENTRATED PHOSPHORIC ACID COMPOUNDS FROM PHOSPHATE ROCK

BACKGROUND OF THE INVENTION

Phosphate rock is a common source of phosphate compounds which are useful in fertilizers, foods, detergents, and in numerous chemical processes. However, the phosphate rock is primarily fluorapatite, $CaF_2 \cdot 3(PO_4)_2$, with minor amounts of organic matter, iron, aluminum and other impurities. Inasmuch as the phosphate in phosphate rock is insoluble in water and in common organic solvents, many processes have been devised in order to convert the phosphate to a soluble form.

In the extensively used so-called "wet-process," phosphate rock is decomposed with sulfuric acid to form calcium sulfate and phosphoric acid. However, process difficulties are encountered when the phosphoric acid is separated from the calcium sulfate because of the difficulty and expense of removing the calcium sulfate by filtration. Furthermore, the wet-process yields relatively weak phosphoric acid, on the order of 33% $P_2O_5$, and contains a large amount of water. In order to concentrate the weak phosphoric acid so that it will be economical to ship, the excess water in the phosphoric acid must be evaporated by the application of large amounts of heat. Furthermore, many impurities are present in phosphoric acid produced by the wet-process, and it is difficult to remove impurities from the acid.

There have been many attempts to overcome the deficiencies in the wet-process treatment of phosphate rock by sulfuric acid. One proposed system involves the use of ammonium bisulfate for treating phosphate rock in the absence of water at elevated pressures and at temperatures above about 350° F. However, this system produces ammonium phosphates and polyphosphates which are difficult to separate from the other products of reaction. Furthermore, the system is not as efficient as is to be desired. It has also been proposed that fertilizer materials may be made of phosphate rock by treating the rock with aqueous solutions of ammonium bisulfate. However, the resultant product in which the phosphate is present predominately as ammonium phosphate, is suitable only for fertilizer because of the impurities which remain after treatment of the rock with the aqueous solution of ammonium bisulfate. Furthermore, the excess of water used to form the solution of ammonium bisulfate results in products which are expensive to ship unless the water is removed by costly evaporation. In addition one of the known systems which utilize ammonium bisulfate as an acidulating agent produce a final product which is substantially pure phosphoric acid. Instead such processes produce varying mixtures in which the predominant phosphate compounds present are ammonium salts of phosphoric or polyphosphoric acids. It is technically difficult to separate ammonium salts of phosphoric acids from ammonium salts of sulfuric acid.

SUMMARY OF THE INVENTION

In accordance with the present invention a concentrated phosphoric acid compound of high purity is obtained from phosphate rock by digesting the rock with molten ammonium bisulfate and a small amount of water to provide a solid reaction product. Between 4 and 9 parts by weight of ammonium bisulfate are employed in the digestion reaction for each part by weight of phosphorous pentoxide in the phosphate rock. An amount of water is utilized sufficient to provide between 5 and 16 percent by weight of water based on the entire weight of the phosphate rock, ammonium bisulfate and water. The digestion of phosphate rock with ammonium bisulfate and water in the specified proportions provides a high yield of solvent-soluble phosphoric acid which is then extracted from the reaction product by a nonaqueous polar oxygen-containing organic solvent having between one and 10 carbon atoms. The phosphoric acid may be separated from the solvent extract by any conventional means such as evaporation of the solvent or by precipitation of the phosphoric acid as a phosphate salt.

Phosphoric acid produced in accordance with this invention has a high $P_2O_5$ content after removal of the solvent, and it may easily and economically be concentrated to super phosphoric acid of about 72 percent $P_2O_5$ by application of heat. As a result the concentrated phosphate is economical to transport. Furthermore, the digestion and extraction process is efficient and cable of providing overall yields of 85 percent of the $P_2O_5$ in the starting phosphate rock.

The ease of separating the phosphate from the reaction mixture is an important feature of this invention. A reaction mixture composed primarily of ammonium sulfate, phosphoric acid and calcium sulfate is produced by the digestion step, and the phosphoric acid is readily separated from this reaction mixture by the solvent extraction hereof. In prior processes which produce a reaction mixture containing ammonium phosphate or polyphosphate instead of phosphoric acid, it is very difficult and costly to separate the phosphate from the ammonium and calcium sulfate in the reaction mixtures.

As a result of this process, phosphates of high purity are produced. The calcium, iron, aluminum and other compounds present in phosphate rock that would form undesirable water-insoluble compounds with phosphates when the phosphoric acid is subsequently neutralized are separated from the phosphoric acid in the extraction step because they are not dissolved except in trace quantities in the solvent. Also, a minimum of sulfate and a minimum of ammonia is carried over the final product thereby resulting in a high $P_2O_5$ content and low level of impurities.

In addition the improved filterability of the solvent slurry of calcium sulfate as compared to the filterability of a water slurry enables the calcium sulfate to be readily removed from the solvent by filtration.

It is also significant that the process of this invention may be conducted at relatively low temperatures and with little input of heat.

Large recycle streams of $H_3PO_4$ are required in conventional processes for the production of phosphoric acid utilizing sulfuric acid as the acidulating agent in order to control the concentration of soluble sulfate ion in the digestion step. If this is not done, formation of $CaSO_4$ at the surface of the individual rock particles causes the reaction to stop, thereby reducing yields to uneconomic levels. No such recycle requirements exist in applicant's process, thereby resulting in additional savings in the production of phosphates.

Figure 1:
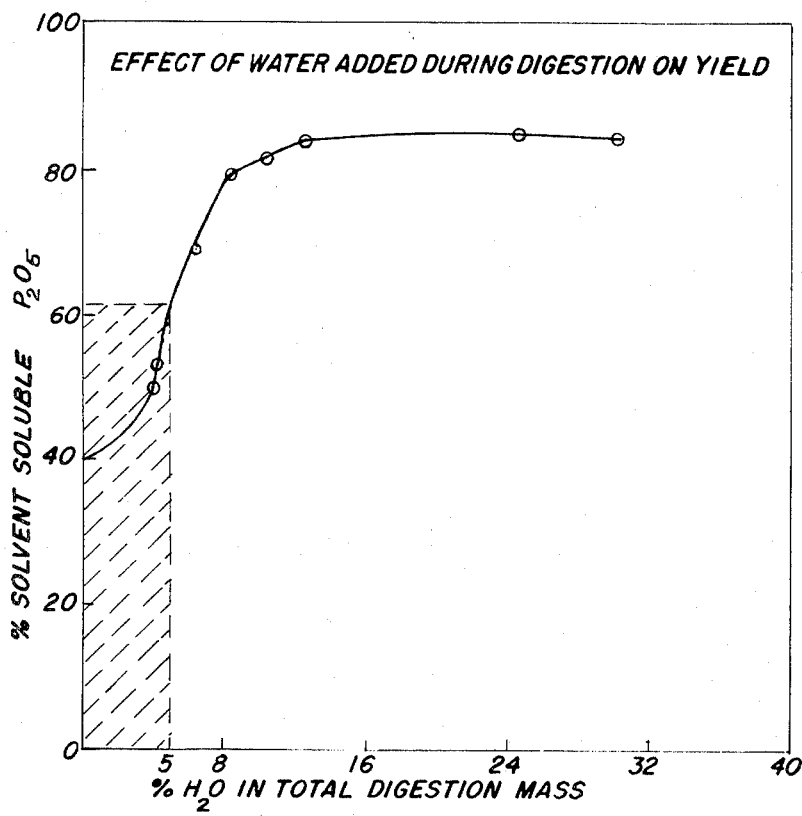
FIG. 1 is a graph which illustrates the increase in the percent of solvent soluble $P_2O_5$ obtained as the percent of water in the digestion mass of this invention is increased. The data for the graph is given in example 4.
Figure 2:
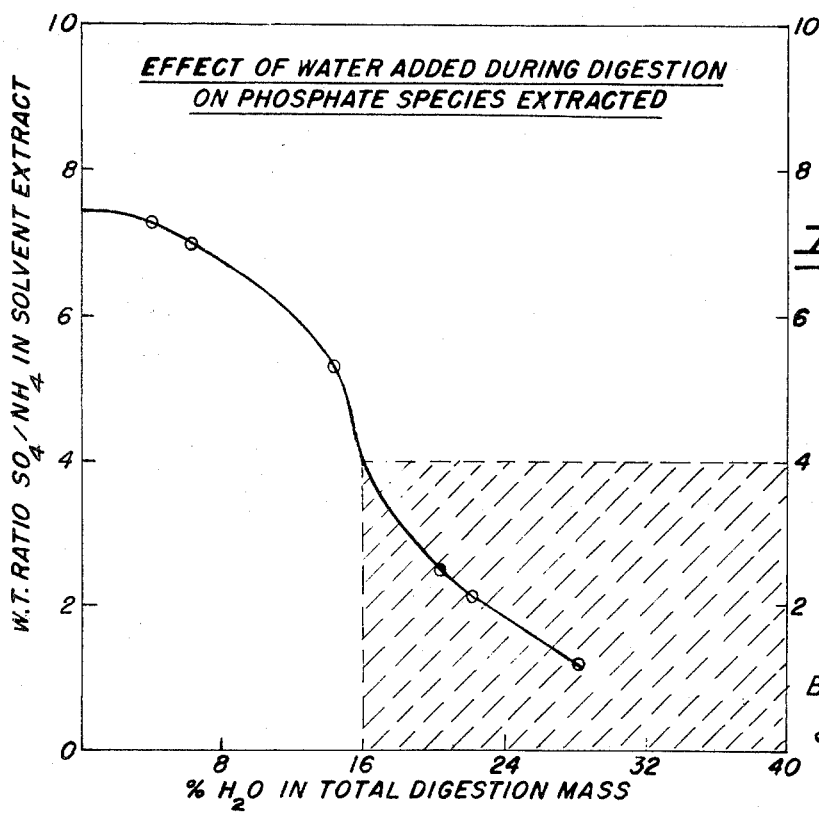

FIG. II is a graph which illustrates the decrease in the weight ratio of sulfate to ammonia in the solvent extract as the amount of water in the digestion mass is increased until an undesirable high proportion of ammonia is present. The data for the graph is given in example 4.

DESCRIPTION OF THE PREFERRED EMBODIMENTS

In greater detail phosphate rock is digested with ammonium bisulfate by mixing molten ammonium bisulfate with ground phosphate rock in a suitable vessel. "Molten" when used in reference to ammonium bisulfate containing small amounts of water describes mixtures which are two-phase systems until heated to temperatures substantially above room temperature. At these temperatures the mixtures become clear, homogeneous, single-phase liquids having an appearance similar to molten anhydrous ammonium bisulfate. It is believed that such mixtures at these temperatures are true melts rather than saturated solutions.

Any commercial grind of phosphate rock may be employed in the digestion reaction because the reaction between phosphate rock and molten ammonium bisulfate occurs rapidly. A digestion time of 2 or 3 minutes is generally sufficient to provide a suitable yield, but 10 to 15 minutes will insure complete digestion.

A small but critical amount of water is mixed with the rock and ammonium bisulfate either before, during or after digestion of the rock and ammonium bisulfate. The water provides a high yield of solvent-soluble orthophosphoric acid and prevents formation of substantial amounts of the solvent-insoluble polyphosphates. Preferably water is mixed with ammonium bisulfate before the phosphate rock is digested with ammonium bisulfate in order to permit the digestion to be conducted at lower temperatures.

Molten ammonium bisulfate is employed in the reaction with phosphate rock as distinguished from aqueous solutions of ammonium bisulfate. The temperature at which the reaction between ammonium bisulfate and phosphate rock is conducted is not critical. However, it is only important that the temperature be sufficient to provide molten ammonium bisulfate. Since the melting point of ammonium bisulfate varies depending upon its water content, the temperature at which the reaction between ammonium bisulfate and phosphate rock is conducted depends upon whether water is added before or after the reaction. If water is added to ammonium bisulfate before the reaction with phosphate rock in the amounts specified herein, the reaction between ammonium bisulfate and rock may be conducted at anywhere between about 20° C. and 150° C. because of the effect of water in reducing the melting point of the ammonium bisulfate. Although the mixtures of ammonium bisulfate and water specified herein are not molten at 20° C., the slow reaction between the bisulfate and phosphate rock in the solid mixture is exothermic, and the temperature quickly rises when the compounds are mixed at the ambient temperature until the ammonium bisulfate becomes molten and the reaction with the phosphate rock continues rapidly. At temperatures below about 20° C., the reaction occurs very slowly, and at temperatures above about 150° C. the digestion reaction of ammonium bisulfate, water, and phosphate rock results in a reduced yield of the desirable solvent-soluble phosphate due to formation of polyphosphates and ammonium phosphates.

On the other hand when the reaction between phosphate rock and ammonium bisulfate is conducted without first adding the specified amounts of water, the digestion just be carried out at higher temperatures in order to provide the molten ammonium bisulfate required for the reaction. Any temperature between 147° C. and 300° C. may be employed when water is not first added to the reaction mixture. Above about 300° C. the final yield of orthophosphoric acid is reduced, and excessive amounts of the relatively solvent-insoluble polyphosphates are obtained.

In order to obtain a high yield of organic solvent-soluble, relatively pure phosphate for efficiency in practicing the process, the amount of ammonium bisulfate reacted with phosphate rock should be between 4 and 9 parts by weight of ammonium bisulfate for each part by weight of phosphorous pentoxide in the phosphate rock. If less than 4 parts by weight of ammonium bisulfate are employed, a low yield of solvent-soluble phosphate is obtained. If more than 9 parts by weight of ammonium bisulfate are employed in the reaction with phosphate rock, no significant increase in the yield of the desired phosphate is obtained.

Furthermore, as the amount of ammonium bisulfate is increased above 9 parts by weight based on phosphorous pentoxide in the rock, the amount of sulfate which is extracted by the solvent also increases, thereby necessitating subsequent removal of the sulfate. Accordingly, since it is desirable to obtain as pure a product as possible, and to avoid waste of sulfate, the amount of ammonium bisulfate is preferably kept below the 9 parts by weight of bisulfate for each part by weight of phosphorous pentoxide. In addition an excess of bisulfate above 9 parts by weight increases the solubility of calcium sulfate which is formed in the reaction of ammonium bisulfate and phosphate rock. This is undesirable, since the calcium sulfate and the phosphate compounds are separated by means of solvent extraction and subsequent filtration. If any calcium which is extracted along with the phosphate is not removed, it will form undesirable insoluble calcium phosphate when the phosphate is subsequently neutralized.

It is essential that a small amount of water be incorporated in the mixture of ammonium bisulfate and phosphate rock in order to obtain a high yield of solvent-soluble phosphate compound when the reaction product is extracted with the polar organic solvent. Although the water is not essential to provide a water-soluble phosphate in the reaction between phosphate rock and ammonium bisulfate, water in the specified proportions is essential to give phosphoric acid soluble in the organic solvent used in the practice of this invention. Between 5 and 16 percent by weight water is employed based upon the total weight of the phosphate rock, ammonium bisulfate and water in reaction mixture. If less than 5 percent by weight of water is employed, the yield of solvent and water-soluble phosphoric acid extracted from the reaction mixture by the solvent is substantially reduced. Also, formation of solvent-insoluble polyphosphates is promoted. More than 16 percent by weight water does not provide any increase in yield of solvent-soluble phosphate but merely dilutes the acid. Additionally above about 16 percent water, the $SO_4/NH_4$ weight ratio in the extract becomes very low indicating the production and extraction of an undesirable amount of ammonium phosphate in place of a portion of the more desirable orthophosphoric acid.

In FIG. I it may be seen that the solvent-soluble yield of $P_2O_5$ as measured by Soxhlet extraction increases steadily until about 12 to 14 percent water by weight has been added to the digestion mixture after which the yield is substantially constant up to the limits studied. That the maximum yield occurs at about 85 percent rather than 100 percent appears to be due to the formation of impurity phosphate compounds, principally iron and aluminum, which are insoluble in the nonaqueous solvents utilized in the practice of this invention. About 5 percent water in the total digestion mass is required to obtain a yield of solvent-soluble $P_2O_5$ above about 60 percent. Lower yields than about 60 percent are not commercially practical. It can be seen from FIG. I that the addition of small quantities of water above 5 percent causes a rapid increase in yield above 60 percent, whereas a small decrease in the amount of water below 5 percent causes a rapid decrease in the yield of $P_2O_5$.

From FIG. II it may be seen that the $SO_4/NH_4$ weight ratio in the methanol extract obtained from the above-mentioned Soxhlet extraction decreases with increasing water concentration in the digestion step. In other words the amount of $NH_4$ in the extract increases as the percent of water increases. This means that increasing amounts of ammonium phosphates are formed which are difficult and costly to separate from the desired phosphoric acid. A high-purity phosphoric acid is desired because it gives greater flexibility in arriving at a final commercial product regardless of whether the product is to be phosphoric acid or a salt of phosphoric acid. When more than about 16 percent of water is present in the digestion mixture, the $SO_4/NH_4$ ratio decreases below about 4, as shown in FIG. II. It can be seen that such a decrease is rapid below 16 percent water, since this percent falls on the steep part of the curve in FIG. II. Therefore, the shaded areas in FIG. I and FIG. II clearly illustrate the areas in which the percent of water in the digestion mixture is too low (FIG. I) or too high (FIG. II), and thereby establishes the optimum percent of water as between 5 and 16 percent.

Another reason for maintaining the amount of water below about 16 percent based on the weight of the digestion mixture is the desirability of obtaining concentrated phosphoric acid or a concentrated phosphate which can be shipped at a minimum of expense. If too much water is present, it is necessary to add heat to evaporate the excess water and raise the concentration to 54 percent commercial grade or 72 percent super phosphoric acid. Because of the substantial amount of heat required to evaporate water, the cost of the process is therefore unnecessarily increased. By varying the amount of water between the 5 and 16 percent, 54 percent $P_2O_5$ acid may be produced directly by removal of the solvent or 72 percent super phosphoric acid may be produced by a relatively small additional concentration or dehydration.

When water is included in the initial reaction mixture of ammonium bisulfate and phosphate rock, the resultant reaction product after the digestion is in the form of a hard mass. The addition of water to the ground hard reaction product after phosphate rock has been digested with molten ammonium bisulfate in the absence of water initially causes evolution of gas. Thereafter the reaction mixture again becomes solid. Regardless of whether the water is added before, during or after the reaction between molten ammonium bisulfate and phosphate rock, the best yields of solvent-soluble phosphoric acid in the extract are obtained if the reaction product is stored, or in other words denned, for at least 6 hours, but preferably up to 48 hours after the addition of water.

Next the reaction or digestion mixture is ground into small particles and extracted with a nonaqueous polar, oxygen-containing organic solvent having between one and 10 carbon atoms. Any well known form of extraction may be employed, such as successive cocurrent extractions or any conventional countercurrent extraction system. Alcohols and ketones are particularly useful as solvents. Examples of suitable solvents include isopropyl alcohol, acetone, n-butanol, sec. butanol, amyl alcohol, methyl-ethyl ketone, n-decanol, and cyclopentanone. Particularly good extraction results have been obtained using methanol as the solvent. When single-stage batch extractions are made solvent to digestate ratios in excess of 3 ml. per gram must be used for maximum extraction but where continuous countercurrent extraction is used ratios of 1 ml. per gram or 0.75 ml. per gram or lower can be used with subsequent higher resulting concentrations of $H_3PO_4$ in the extract.

After the digestion product is extracted, the extraction solvent contains dissolved orthophosphoric acid together with small amounts of sulfate and ammonia. The solids remaining in the reaction product after extraction are primarily composed of calcium sulfate and ammonium sulfate with small amounts of the other impurities originally found in the phosphate rock. Any conventional filtration apparatus may be used to separate the solvent containing the phosphoric acid from the solids. If it is desired to produce a phosphate compound of very high purity, the amount of sulfate in the extract may be reduced by partial evaporation of the solvent or by shilling the solvent. Either of these procedures precipitates ammonium sulfate, ammonium bisulfate, or both in the solvent which may then be removed by further filtration. However, since the amount of sulfate in the organic solvent may be very small, this further purification step is not necessarily essential for most purposes.

In order to obtain phosphoric acid from the solvent extract, evaporation of the solvent and recovery for subsequent use is preferred. Upon distillation or evaporation of the solvent, phosphoric acid of a concentration of up to 72 percent $P_2O_5$ remains after the solvent has been removed by evaporation. The concentration of the phosphoric acid depends upon the amount of water originally added to the reaction mixture. The phosphoric acid may readily be further concentrated by heating the acid to drive off water. Superphosphoric acid, which contains about 72 percent $P_2O_5$ and is a mixture of orthophosphoric acid with polyphosphoric acids, is easily produced. This compound contains very little water and is quite economical to ship.

Alternatively, phosphoric acid compounds may be precipitated from the organic extraction solvent as salts. Ammoniation of the solvent after reduction of the sulfate results in the formation of a very pure ammonium phosphate precipitate containing a high concentration of $P_2O_5$ which may be readily removed by filtration. This water-soluble compound is an extremely valuable fertilizer. Animal feed may be provided by adding a calcium compound to the organic solvent in the form of a base to precipitate calcium phosphate. Also, sodium hydroxide neutralization of the extraction solvent will result in the precipitation of sodium phosphate, which is useful in detergents. Neutralization with potassium compounds such as potassium hydroxide will yield a precipitate of potassium phosphate which is useful fertilizer material. Accordingly, it can be seen that the phosphoric acid compound is readily separated from the organic extraction solvent either by evaporation, or by precipitation in the form of a salt.

Additional methods such as electrodialysis or ion exchange may be employed. Also aqueous extraction may be used to separate the phosphoric acid from water-immiscible organic extraction solvents. However, this procedure is not usually feasible economically if the resultant product is to be shipped because a dilute product is obtained and concentration as by evaporation must be resorted to in order to obtain a product of 54 percent $P_2O_5$ or greater.

Phosphoric acid compounds of high purity are obtained by the process of this invention because the digestion step with the specified proportions of phosphate rock, ammonium bisulfate and water provides a reaction product from which only phosphoric acid with minor amounts of impurities are extracted by the organic extraction solvent. Analysis reveals that sulfate to $P_2O_5$ weight ratios of less than 0.15 are readily and directly obtained with this process. The total amount of other impurities before further purification remaining in the phosphoric acid after the extraction solvent is evaporated is usually less than 1 percent by weight. Therefore very little further purification of the high-purity phosphate compounds produced by this process is required.

The following examples illustrate the method of practicing the invention:

EXAMPLE 1

Twenty-two hundred grams of Florida phosphate rock (34.4% $P_2O_5$) was reacted with 3,960 g. ammonium bisulfate and 740 parts water in an agitated mixer at 100° C. for 15 minutes. The resulting mixture was transferred into trays, cooled to ambient temperature, and stored for 48 hours.

The cooled digestion-mixture was then crushed so that approximately 95 percent of the mixture passed through a 40-mesh screen.

The screened solids were then introduced into an extractor where these solids were contacted in a countercurrent manner with methanol. One milliliter of methanol was used per gram of solids. After a residence time in the extractor of 90 minutes, the 6,900 ml. of rich extract was polish-filtered and the extracted solid residue was filtered to remove the entrapped methanolic solution. The clarified rich extract containing 615.4 g. $P_2O_5$, 69.0 g. $SO_3$, 23.0 g. $NH_3$ and 555 g. $H_2O$ was then chilled to −60° F. and filtered, removing a portion of the $(NH_4)_2SO_4$ by crystallization and producing a final rich extract containing 615.0 g. $P_2O_5$, 38.2 g. $SO_3$, 9.9 g. $NH_3$ and 555 g. $H_2O$.

The final rich extract was then evaporated under vacuum in a stainless-steel still where the methanol and water were removed yielding 854.2 g. of a product analyzing 72 percent $P_2O_5$, 4.5 percent $SO_3$, and 1.1 percent $NH_3$. The other impurities in this product were $SiO_2$, 500 p.p.m., $Fe_2O_3$ 1,200 p.p.m., MgO 200 p.p.m., $Al_2O_3$ 20 p.p.m., $Cr_2O_3$ 150 p.p.m., CaO 5.0 p.p.m., and F 10 p.p.m.

EXAMPLE 2

One hundred grams of Florida phosphate rock (34.0% $P_2O_5$) was reacted with 220 g. of $NH_4HSO_4$ and 35.5 g. of $H_2O$ under reflux at 120° C. for 20 minutes with constant agitation. The molten mass was placed in a teflon lined tray, held for 48 hours, and ground with a mortar and pestle. The ground digestate was then mixed with 1,000 ml. of methanol and agitated under reflux for 20 minutes. The solid residue was separated from the methanol extract by vacuum filtration. Two hundred and ninety grams of dry solids were recovered having an analysis of 3.1 percent $P_2O_5$.

The methanol extract consisted of 800 g. containing 3.12 percent $P_2O_5$, 1.57 percent $SO_4$ and 0.029 percent $NH_4$. Then 4.04 g. of $NH_3$ gas was passed into the extract which was then cooled and filtered. The residue recovered weighed 15.77 g. and consisted of 15.57 g. $(NH_4)_2SO_4$ and 0.2 g. $NH_4H_2PO_4$. The filtrate (795 g.) contained 3.13 percent $P_2O_5$, 0.16 percent $SO_4$ and 0.029 percent $NH_4$.

After filtration, 6.23 g. of $NH_3$ gas was added to the filtrate and a precipitate weighing 42.43 g. (dry basis) was recovered by filtration, which consisted of 4.1 percent $(NH_4)_2SO_4$ and 95.9 percent $NH_4H_2PO_4$.

EXAMPLE 3

Twenty-five grams of Florida phosphate rock (34.0% $P_2O_5$) was reacted with 50 g. of ammonium bisulfate at 200° C. under conditions of constant agitation for 5 minutes. The resulting melt was then cooled and stored for 48 hours, and contained 8.5 g. of $P_2O_5$.

the hard mass was then ground in a mortar so that 100 percent passed through a 40-mesh screen and this ground material was mixed with 8.4 g. of water in a Waring blender and after denning for 48 hours, extracted with 50 ml. of methyl alcohol is a Soxhlet extractor for 4 hours.

The extracted residue was then dried and analyzed. The residue contained 1.7 g. of $P_2O_5$ and the methanolic extract contained 6.8 g. of $P_2O_5$, 6.0 g. of $SO_3$ and 1.2 g. $NH_3$. Upon evaporation of the methanol a black, syruplike liquid remained which analyzed as 72 percent $P_2O_5$, phosphoric acid.

The foregoing procedure was repeated using the identical conditions and proportions except that water was not added to the reaction mixture. An analysis of the residue revealed that it contained 3.4 g. of $P_2O_5$ and the methanolic extract contained 5.1 g. $P_2O_5$. This reveals that a much lower yield is obtained when water is not added to the reaction mixture of phosphate rock and ammonium bisulfate.

EXAMPLE 4

One hundred grams of Florida phosphate rock containing 34% $P_2O_5$ was mixed with 200 g. of reagent grade ammonium bisulfate and the amounts of distilled water specified in the tables below in a 500-ml. resin reaction flask maintained at 120° C. by means of an electrical heating mantle. Immediately after introducing the ingredients into the flask, the flask cover was clamped into place. A reflux condenser cooled by tap water was mounted on the cover and a stirrer shaft passed through a teflon packing gland in the cover. A third opening in the cover carried a glass thermometer.

The reaction mass was maintained at 120° C. for 20 minutes under constant agitation. At the end of this time the cover was removed and the entire contents poured onto the surface of a teflon-coated tray in such a way as to leave a very thin film (one-quarter inch or less) of the digested mass. The tray and contents were allowed to cool to ambient temperature and then stored in a polyethylene bag for 48 hours.

Next the solid digested mass was removed from the tray, ground by means of a mortar and pestle and analyzed for a total $P_2O_5$. The ground digested mass was then extracted with methanol by Soxhlet extractions and the amount of methanol-soluble $P_2O_5$ was determined by analysis of the residue. The percent of solvent-soluble $P_2O_5$ is set forth in table I and plotted in FIG. 1 against the percent of water in the digestion mass.

TABLE I

| % $H_2O$ | % Solvent-soluble $P_2O_5$ |
|---|---|
| 3.95 | 50.0% |
| 4.0 | 52.5% |
| 6.0 | 69.2% |
| 8.0 | 80.0% |
| 10.0 | 82.5% |
| 12.0 | 84.0% |
| 24.2 | 85.1% |
| 30.0 | 85.0% |

In order to obtain the data plotted in FIG. II, tests were made in the same manner as for FIG. I and the solvent extract was analyzed for $NH_4$ and $SO_4$ to establish the $SO_4/NH_4$ ratio. The ratio for varying percents of water in the digestion mass are set forth in the following table II and plotted in FIG. II:

TABLE II

| % $H_2O$ | WT Ratio $SO_4/NH_4$ |
|---|---|
| 4.0 | 7.3 |
| 6.0 | 7.0 |
| 14.0 | 5.3 |
| 20.0 | 2.5 |
| 22.0 | 2.15 |
| 28.0 | 1.25 |

What is claimed is:

1. The method of obtaining concentrated phosphoric acid from phosphate rock which comprises:

digesting a mixture of ground phosphate rock, molten ammonium bisulfate in an amount between about 4 and 9 parts by weight based upon the weight of phosphorous pentoxide in said rock, and water in an amount between about 5 and 16 percent by weight based upon the total weight of said mixture of phosphate rock, ammonium bisulfate and water;

extracting phosphoric acid from the solid product resulting from such digestion by contacting said product with a solvent for phosphoric acid selected from the group consisting of alcohols and ketones having between one and 10 carbon atoms to dissolve such phosphoric acid in said solvent; and then separating phosphoric acid from said solvent by evaporating said solvent.

2. The method of claim 1 wherein the water is incorporated in the digestion mixture before any substantial reaction has occurred between the phosphate rock and the ammonium bisulfate, and the digestion of such mixture is carried out at a temperature of between about 20° C. and 150° C.

3. The method of claim 1 wherein the phosphate rock and ammonium bisulfate are digested at a temperature between about 147° C. and 300° C., and the water is added to the digestion mixture after reaction between the phosphate rock and ammonium bisulfate.

4. The method of claim 1 wherein methanol is the solvent used to extract phosphoric acid from the ground product resulting from the digestion of phosphate rock, ammonium bisulfate and water.

5. The method of obtaining an inorganic phosphate salt from phosphate rock which comprises:

digesting a mixture of ground phosphate rock, molten ammonium bisulfate in an amount between about 4 and 9 parts by weight based upon the weight of phosphorous pentoxide in said rock, and water in an amount between about 5 and 16 percent by weight based upon the total weight of said mixture of phosphate rock, ammonium bisulfate and water;

extracting phosphoric acid from the solid product resulting from such digestion by contacting said product with a solvent for phosphoric acid selected from the group consisting of alcohols and ketones having between one and 10 carbon atoms to dissolve such phosphoric acid in said solvent; and then precipitating an inorganic phosphate salt selected from the group consisting of ammonium phosphate, alkali metal phosphates and alkaline earth metal phosphates from the solution of phosphoric acid in said solvent by adding a base having a corresponding cation to said solution.

6. The method of claim 5 wherein the water is incorporated in the digestion mixture before any substantial reaction has occurred between the phosphate rock and the ammonium bisulfate, and the digestion of such mixture is carried out at a temperature of between about 20° C. and 150° C.

7. The method of claim 5 wherein the phosphate rock and ammonium bisulfate are digested at a temperature between about 147° C. and 300° C., and the water is added to the digestion mixture after reaction between the phosphate rock and ammonium bisulfate.

* * * * *

FO-1050
(5/69)

UNITED STATES PATENT OFFICE
CERTIFICATE OF CORRECTION

Patent No. 3,635,669     Dated January 18, 1972

Inventor(s) ALLEN G. RUBIN

It is certified that error appears in the above-identified patent and that said Letters Patent are hereby corrected as shown below:

Col. 1, line 9, change "$CaF_2 \cdot 3(PO_4)_2$" to -- $CaF_2 \cdot 3Ca_3(PO_4)_2$ --

Col. 1, line 38 "Made of phosphate" should be -- made from phosphate -- .

Col. 1, line 47 , "one of the known" should be -- none of the known -- .

Col. 2, line 7, change "cable" to -- capable -- .

Col. 3, line 40, change "just" to -- must -- .

Col. 5, line 44, change "shilling" to -- chilling -- .

Signed and sealed this 6th day of June 1972.

(SEAL)
Attest:

EDWARD M. FLETCHER, JR.
Attesting Officer

ROBERT GOTTSCHALK
Commissioner of Patents